July 1, 1930. S. L. MADORSKY 1,768,622
PROCESS FOR THE DIRECT REDUCTION OF IRON FROM ITS ORES
Filed Nov. 25, 1925
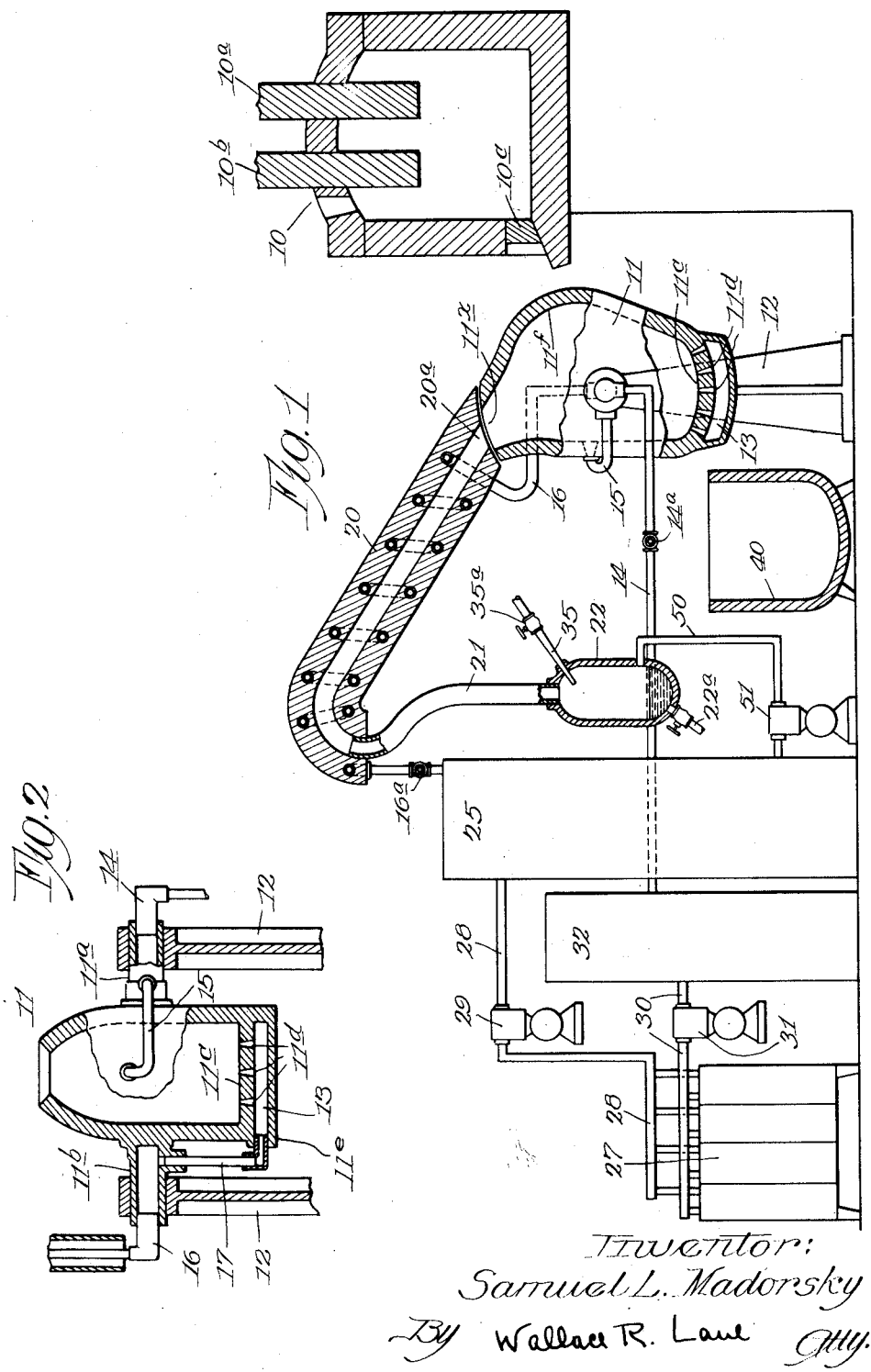

Patented July 1, 1930

1,768,622

UNITED STATES PATENT OFFICE

SAMUEL L. MADORSKY, OF CHICAGO, ILLINOIS, ASSIGNOR TO GATHMYS RESEARCH CORPORATION, OF CHICAGO, ILLINOIS, A CORPORATION OF ILLINOIS

PROCESS FOR THE DIRECT REDUCTION OF IRON FROM ITS ORES

Application filed November 25, 1925. Serial No. 71,310.

This invention relates to a process for the direct reduction of iron from its ores, and has for an object such reduction in an efficient and practical manner. Other objects consist in the local generation of hydrogen and oxygen, supply of the former to the molten ore to effect reduction of the same and supply of the oxygen thus produced to combine with the excess of hydrogen to maintain the temperature of the molten mass above the melting point; to salvage the excess of hydrogen used in the process for re-use or other purpose; to so treat the molten ores of iron or the like to produce a pure iron by direct reduction. These and other objects will be more fully described and set forth in the following specification.

In the accompanying drawings, I have illustrated apparatus, more or less diagrammatically, adapted to carry out my process. In the drawings—

Fig. 1 is a side elevation of the apparatus, portions thereof being broken away for illustrative purposes.

Fig. 2 is a vertical section through the converter, a portion thereof being shown in elevation.

10 indicates generally a preliminary electric melting furnace of conventional construction, having the electrodes $10^a$ and $10^b$, and an outlet portion $10^c$ closed during the melting by a clay plug or the like. Located below and adjacent the outlet duct $10^c$ is the converter 11 provided with the hollow trunnions $11^a$ and $11^b$ journaled in the supporting standards 12, as shown for example in Fig. 2. This converter is provided with a false bottom $11^c$ provided with the apertures $11^d$, the false bottom being spaced from the main bottom $11^e$ to form a chamber 13. One side of the converter is provided with the bulge $11^f$. An oxygen supply duct 14 communicates with the hollow trunnion $11^a$, and a pipe or tube 15 leads therefrom to the interior of the converter 11. A hydrogen supply duct 16 communicates with the other hollow trunnion, from which leads a tube or duct 17 to the chamber 13. An exhaust duct or chimney 20 is provided, open at its lower end at $20^a$ and discharging at its upper end through a pipe 21, which leads to a condensing chamber 22. The hydrogen tube 16 is coiled around in the wall of chimney 20 and extends therefrom to the hydrogen supply tank 25, a valve $16^a$ being provided in the hydrogen line for cut-off or control of the hydrogen supply. Located in the vicinity of the apparatus described is an electrolytic unit 27, comprising conventional cells for the electrolysis of water or the like in well-known manner, the hydrogen being taken off from the cathodes through a duct 28. Co-acting with the duct 28 is the compressor 29, the duct being continued to the hydrogen supply tank. Similarly a tube or duct 30 receives the oxygen from the anodes, conveys it to a second compressor 31, which delivers it through a continuation of the duct 30 to the oxygen tank 32. From the oxygen tank the oxygen supply duct 14 leads to the trunnion $11^a$, as described above, a valve $14^a$ being inserted in the line for control of the oxygen supply. A spray nozzle 35 extends into the condensing tank 22 to spray a cooling liquid thereinto, the valve $35^a$ being provided to control this spray. From the tank 22 leads the valved discharge pipe $22^a$ to permit continuous or intermittent discharge of the spray liquid from the condensing tank. Located at one side of and below the converter 11 is the receiving ladle or pot 40. The upper end of the converter 11 is open at $11^x$, and is of arcuate convex construction to lie closely adjacent the end of the chimney 20 when in the position shown in Fig. 1. From this position it may be swung either to the right to align with the discharge spout $10^c$ of the melting tank, or to the left to discharge its contents into the pot 40.

In the practice of my process, molten ore of iron or other metal is charged into the converter 11 and is received in the bulged side $11^f$, so as not to obstruct or plug the apertures $11^d$. Hydrogen gas is then flowed through duct 16, and the converter is tilted to the position shown in Fig. 1, when the hydrogen will pass or bubble through the molten ore. The hydrogen is preferably supplied in an amount equal to twice the hydrogen combining with the oxygen content of the ore in order to insure the stability of the reduction reaction. I have found that the heat of the reduction reaction is far from sufficient to maintain the ore and iron reduced therefrom in molten condition, and in order to maintain this condition, which is necessary for the proper carrying out of the process, I supply oxygen through the pipe 15 above the surface of the molten ore or iron. This oxygen will combine with a portion of the excess of hydrogen over that utilized in the reduction of the ore, and the heat of this reaction will maintain the mass in molten condition.

As soon as the process is under way, the hydrogen supplied to the converter is pre-heated due to this discharge through the coils of the chimney 20, and this greatly increases the efficiency of the process. By generating the hydrogen and oxygen in the locality of the converter, I am able to obtain a supply of pure gases, and the oxygen which would otherwise be of value only as a by-product is available for the necessary heat maintenance of the reduction process. The oxygen may be pre-heated if so desired.

The gas exhausting through the chimney 20 may contain a number of components, including hydrogen, which it is desirable to salvage, and I have illustrated a diagrammatic arrangement for recovering the hydrogen. For example, this exhaust gas being greatly cooled by passage through the spray from nozzle 35, the other components of the exhaust gas may be condensed or absorbed and the hydrogen recovered through duct 50, compressed by compressor 51, and delivered into the hydrogen tank 25 for re-use. When the ore has been reduced to pure iron, the converter may be tilted to discharge its contents into the pot or ladle 40, or the constituents necessary to produce various kinds of steel may be charged into the converter, and steel in this manner directly produced prior to discharge into the pot or ladle 40.

After discharge of the metal from the converter 11, it is tilted back to receive a fresh charge from the furnace 10, and in this manner the process may be carried on substantially continuously.

It will be apparent that my process may be carried out in other forms of apparatus, and the particular practice hereabove described may be varied without departing from the spirit of the invention, hence I wish the above description and the accompanying drawings to be understood as illustrative only and not as limiting the scope of my invention.

What I claim is:

1. A method of obtaining pure metal from its ore comprising reducing the ore to a molten mass, then subjecting the molten mass to the action of a reducing gas having an affinity for the oxygen contained in said mass, the volume of gas being in excess of the combinable oxygen content of said molten mass, and simultaneously treating said molten mass so as to cause it to remain in a molten condition.

2. A method of obtaining pure metal from its ore comprising reducing the ore to a molten mass, then subjecting the molten mass to the action of a reducing gas having an affinity for the oxygen contained in said mass, the volume of gas being in excess of the combinable oxygen content of said mass, and maintaining said mass in a molten condition by simultaneously supplying above said mass a second gas having an affinity for the first mentioned gas.

3. A method of obtaining pure metal from its ore comprising reducing the ore to a molten mass, then subjecting the molten mass to the action of a reducing gas having an affinity for the oxygen contained in said mass, the volume of gas being in excess of the combinable oxygen content of said mass, maintaining said mass in a molten condition by simultaneously supplying above said mass a second gas having an affinity for the first mentioned gas, and recovering for reuse any uncombined excess of said first mentioned gas.

4. A method of obtaining pure metal from its ore comprising reducing the ore to a molten mass, then subjecting the molten mass to the action of hydrogen gas by causing said gas to travel upwardly through the molten mass, the volume of hydrogen being about twice in volume to the combinable oxygen content of the molten mass, and simultaneously treating said molten mass so as to cause it to remain in a molten condition.

5. A method of obtaining pure metal from its ore comprising reducing the ore to a molten mass condition, passing hydrogen through said mass, the volume of hydrogen being in excess of the combinable oxygen content of said mass, and simultaneously supplying oxygen above the molten mass so as to cause said mass to remain in a molten condition.

6. A method of obtaining pure metal from its ore comprising reducing the ore to a molten mass, passing hydrogen through said mass, the volume of hydrogen being in excess of the combinable oxygen content of said mass, simultaneously supplying oxygen above the molten mass so as to cause said mass to remain in a molten condition, and recovering for reuse any uncombined excess of hydrogen.

7. A method of obtaining pure metal from its ore comprising reducing the ore to a molten mass, pre-heating a reducing gas having an affinity for the oxygen contained in the molten mass, and then passing the pre-heated gas through said mass, the volume of gas being in excess of the combinable oxygen content of said molten mass, and simultaneously treating the molten mass so as to cause it to remain in a molten condition.

8. A method of obtaining pure metal from its ore comprising reducing the ore to a molten mass, pre-heating hydrogen gas and then passing it upwardly through the molten mass, the volume of hydrogen gas passed through the molten mass being in excess of the combinable oxygen content of said molten mass, and simultaneously supplying oxygen above said molten mass so as to retain said mass in a molten condition.

In witness whereof, I hereunto subscribe my name to this specification.

SAMUEL L. MADORSKY.